March 1, 1938.    C. G. A. ROSEN    2,109,735
ENGINE
Filed May 31, 1933    2 Sheets-Sheet 1

INVENTOR.
Carl G.A. Rosen
BY
ATTORNEY.

March 1, 1938.  C. G. A. ROSEN  2,109,735

ENGINE

Filed May 31, 1933  2 Sheets-Sheet 2

INVENTOR.
Carl G. A. Rosen
BY
ATTORNEY.

Patented Mar. 1, 1938

2,109,735

UNITED STATES PATENT OFFICE 2,109,735

ENGINE

Carl G. A. Rosen, Oakland, Calif., assignor to Caterpillar Tractor Co., San Leandro, Calif., a corporation of California Application May 31, 1933, Serial No. 673,658

4 Claims. (Cl. 309—9)

The present invention relates to internal combustion engines, and more particularly to the provision of an improved piston construction therefor. The invention is particularly useful in compression ignition and the like engines, such as Diesels, for example.

It is an object of the invention to provide an internal combustion engine constructed to avoid sticking of the rings on the pistons thereof.

Another object of the invention is to provide a compression ignition and the like engine including a piston constructed to prevent the transmission of an excessive amount of heat to the top ring thereof.

Another object of the invention is to provide a compression ignition and the like engine including a piston adapted to direct the flow of heat therethrough.

Another object of the invention is to provide a compression ignition and the like engine including a piston having a body portion formed of metal having suitable wearing qualities, and a removable head formed of metal having relatively high heat-transmitting qualities.

Another object of the invention is to provide a compression ignition and the like engine including a piston constructed to provide even heating of the rings mounted therein.

Another object of the invention is to provide a compression ignition and the like engine including a piston constructed to provide even expansion of the skirt portion thereof.

Other objects will appear as the description progresses.

Figure 1:
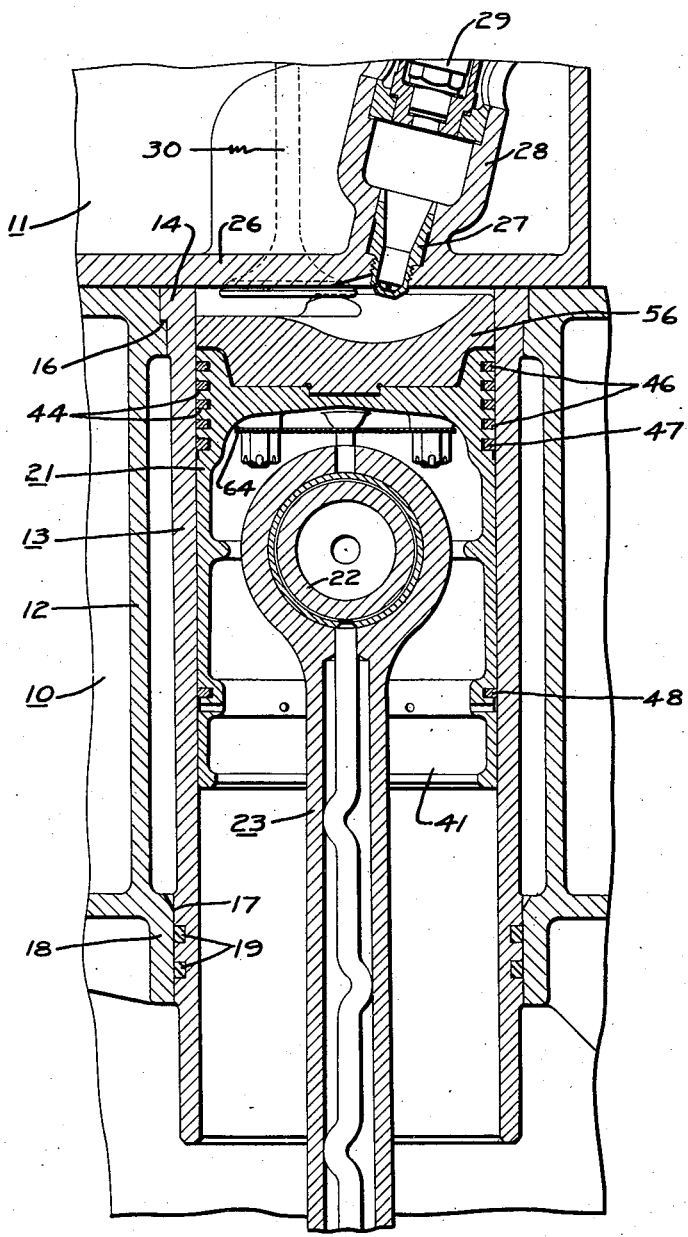
Fig. 1 is a transverse, vertical section through the center line of a cylinder of a compression ignition engine, having a piston mounted therein constructed according to the instant invention.

In the conventional type of piston used in high temperature engines, such as compression ignition and the like engines, it is found that heat flowing from the combustion chamber through the crown or head of the piston raises the temperature of the uppermost compression ring, which is in the direct path of flow of the heat, to such an extent as to cause sticking of such ring. Sticking of the uppermost ring permits a direct flow of heat to the next ring which becomes overheated as a consequence and also sticks. Eventually all of the rings may become jammed if operation of the engine is not stopped, and such occurrence, as is well known, not only interferes with operation of the engine but also causes scoring of the cylinder and of the piston.

The present invention overcomes the above noted disadvantages by providing a directed, substantially uniform flow of heat from the combustion chamber to the rings in the piston, the majority of the heat being transmitted through such rings and the remainder through the skirt of the piston. The directed flow of heat is accomplished by providing a metallic path of flow for the heat through the central portion of the piston past the top ring groove, the metallic path then extending radially outward adjacent the intermediate ring grooves. From the radial portion the path extends upwardly to the top ring groove and downwardly past the bottom ring groove to the skirt of the piston, the latter path conducting the major portion of the heat whereby the top ring remains slightly cooler than the other rings. It is desirable to maintain the top ring at a lower temperature than the others to provide a smooth, free sealing engagement thereof with the cylinder wall which seals off hot gases of combustion thereby insuring efficient lubrication at all points below the top ring. This feature adds materially to the life of the engine.

The piston construction also distributes the heat uniformly throughout the piston body thereby providing for even expansion thereof, preventing the buckling of the skirt common in the ordinary piston construction, and preventing distortion of the wrist pin bosses and the ensuing wear thereof due to pounding of the wrist pin therein. To accomplish the above outlined advantages, the body portion is made of metal providing good wear-resisting qualities for the wrist pin bosses and for the ring grooves, such as cast iron, for example, while the head is made of a lighter metal having a high heat conductivity, such as aluminum, or an aluminum alloy, for example. As is well known, during combustion localized "hot spots" occur in the top surface of the piston, and the heat therefrom if not dissipated before reaching the wrist pin bosses and the piston skirt, causes distortion thereof. By providing a piston crown of a metal having a high heat conductivity, the localized heating of the piston is dissipated quickly and the heat is transferred uniformly to the piston body thus preventing localized heating thereof at undesirable places. Thus the invention permits the use of a metal of good wearing qualities for principal bearing surfaces of the piston, while avoiding the undesirable thermal conditions usually existing in such metals.

The compression ignition engine disclosed herein includes engine block or body portion 10 (Fig. 1) having cylinder head 11 suitably secured thereon. Said block 10 includes internal wall 12 forming a water jacket around cylinder liner 13. At its top, liner 13 has annular lip 14 engaging a corresponding seat 16 in wall 12, and adjacent its bottom has annular raised portion 17 engaging boss 18 in said wall 12, suitable gaskets 19 being provided to make the joint water tight. Piston 21 is mounted in liner 13, and has wrist pin 22 journaled therein in suitable wrist pin bosses and providing a bearing for connecting rod 23 which is suitably connected at its lower end to the crankshaft (not shown). It is to be noted that the water jacket is of such extent as to provide a flow of heat thereto through the cylinder wall throughout the length of the piston. The construction of piston 21 is described more specifically hereinafter.

The head of piston 21 provides with bottom wall 26 of cylinder head 11 a combustion chamber into which gasified fuel is injected through burner tube, 27 from precombustion chamber 28. The preliminary explosion in the precombustion chamber and the explosion in the combustion chamber are due solely to the injection of atomized fuel into air under pressure and at a high temperature, the fuel being injected into precombustion chamber 28 through fuel injection nozzle 29, suitably mounted in head 11. Suitable intake and exhaust valves are mounted in head 11, one of such valves being indicated at 30.

As is well known with respect to the above-described type of engine, and other high temperature engines, combustion takes place at a comparatively slow rate and hence the piston head or crown is subjected to the combustion flame for a relatively substantial time and hence receives, and must dissipate a large amount of heat. The piston construction about to be described provides for effective dissipation of the heat without undue heating of the rings therein by providing a head or crown which contacts only the central portion of the piston body, being partially insulated from the ring bearing portion thereof. The removable crown is formed of a material of high heat conductivity, such as aluminum, for example, while the piston body is formed of a material having good wearing qualities, such as cast iron or other ferrous material, for example, which does not have a high heat conductivity.

Figure 2:
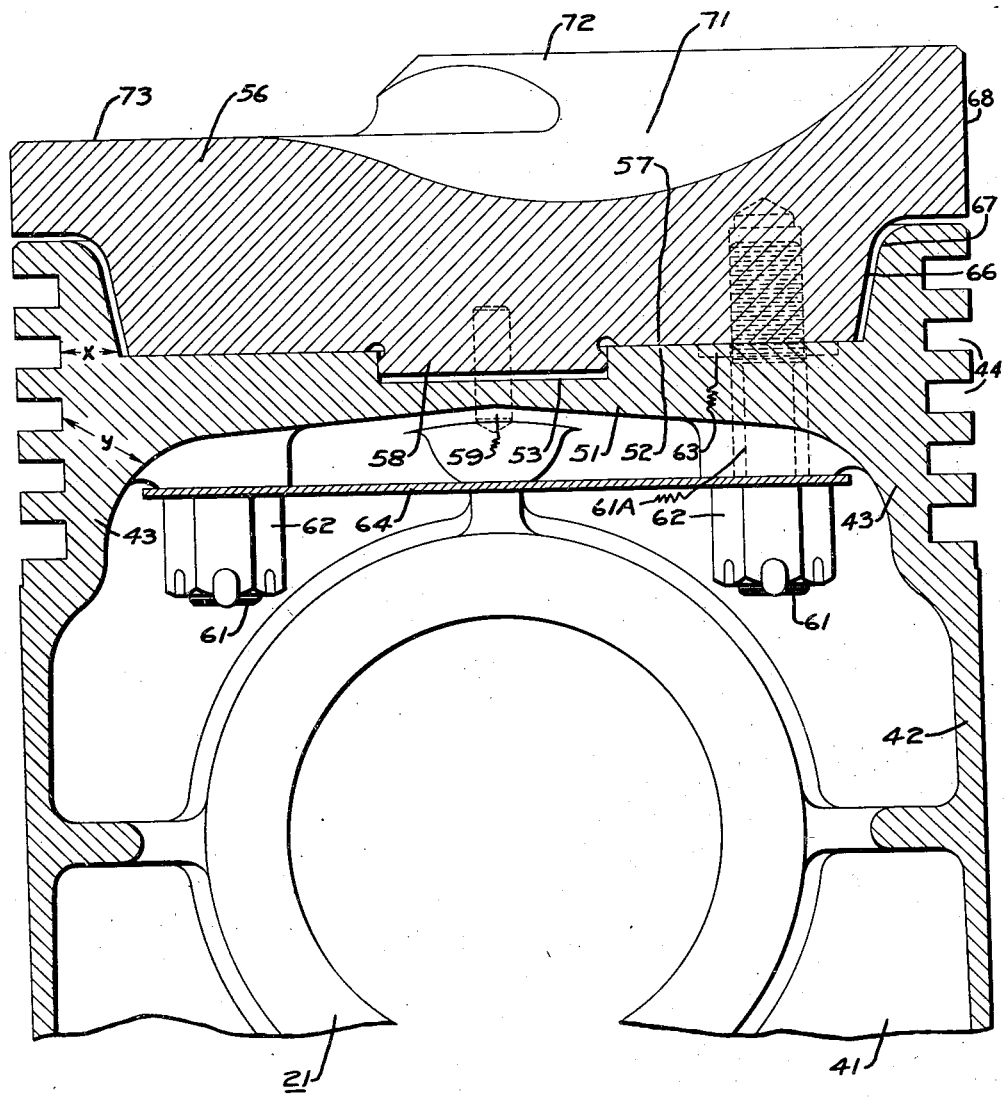
Fig. 2 is a fragmentary enlarged section of the piston taken similarly to the view shown in Fig. 1.

Piston 21 (Fig. 2) includes body portion 41 having cylindrical skirt 42 terminating at the top in thicker ring bearing portion 43 having a plurality of annular grooves 44. Grooves 44 (Fig. 1) receive compression rings 46 and oil ring 47. Skirt 42 is also grooved adjacent the bottom to receive oil ring 48. Intermediate the ends of ring bearing portion 43 (Fig. 2) central top partition wall 51 of body portion 41 is joined thereto, said wall 51 being of increasing thickness radially from the center thereof, and being spaced from the wrist pin bosses to serve as means providing a path of flow for heat from the top of the piston to ring bearing portion 43 independent of said bosses. Wall 51 has flat annular crown engaging portion 52 around central recess 53.

Crown or head 56 has flat annular bottom surface 57 engaging surface 52 and central cylindrical extension 58 seated in recess 53 of wall 51. Said crown 56 is located with respect to body portion 41 by dowel 59 and is secured thereto by a plurality of studs 61 threaded in said crown and having cotter-held nuts 62 threaded thereon. Each stud 61 is provided with reduced portion 61A extending through wall 51 and providing a degree of flexibility to the connection between the crown and the body compensating for differing expansions thereof while maintaining constant engagement therebetween. Each stud 61 is surrounded by a suitable gasket 63 seated in piston body 41. Each gasket is preferably formed of copper asbestos material. Studs 61 and nuts 62 also secure splash plate 64 in place.

It is to be noted that annular surface 57 is of less diameter than surface 52 whereby outer wall 66 of crown 56 is spaced from conforming wall 67 of ring bearing portion 43 of the piston body. Wall 66 extends upwardly from surface 57 and then substantially horizontally above wall 67 but spaced therefrom, joining vertical wall 68, spaced slightly within the outer periphery of skirt portion 42 in conformity to the outer periphery of ring bearing portion 43. It is to be noted that the thickness of ring bearing portion 43 at $x$, adjacent surface 52, is less than at $y$, adjacent the lower surface of top wall 51, whereby a smaller amount of heat is transmitted to the upstanding annular part of ring bearing portion 43.

The top surface of crown 56 is formed specially to provide a combustion chamber of suitable characteristics for compression ignition engines, and is symmetrical with respect to the line of the section shown. Said surface includes substantially semi-spherical depression 71 offset from the center of the piston, terminating in substantially semi-circular high ledge 72, and corresponding lower ledge 73.

It is believed obvious from the foregoing description that the provision of a piston crown of high heat conductivity which is partially insulated from the ring bearing portion of the piston body, insures substantially even heating of the rings, thereby preventing sticking of the rings, the uppermost ring being maintained at a slightly lower temperature than the others. This construction also provides a uniform flow of heat to the piston body producing an even expansion thereof to prevent buckling of the skirt and distortion of the wrist pin bosses. It is also to be noted that the above described piston construction permits the use of material of good wear-resisting qualities where such are desirable, while preventing undesirable heat conditions in the piston.

I, therefore, claim as my invention:

1. A piston construction for high temperature engines, such as compression ignition and the like engines, including a piston body having a cylindrical skirt, a substantial cylindrical ring bearing portion above said skirt, a top wall joined to said ring bearing portion intermediate the ends thereof whereby the upper part of said ring bearing portion forms an annular upward extension of said body, said top wall increasing radially in thickness from the center and having an annular flat top surface around a central cylindrical recess; and a piston head having an annular flat bottom surface engaging said top surface and a central cylindrical extension seated in said recess, the wall of said head having a portion in alignment with the outer wall of said ring bearing portion, and a second portion conforming to the contour of the inner wall of said annular extension but spaced therefrom; and means for mounting said head on said body.

2. A piston construction for high temperature engines, such as compression ignition and the like engines, including a piston body having a cylindrical skirt, a substantial cylindrical ring bearing portion above said skirt, a top wall joined to said ring bearing portion intermediate the ends thereof whereby the upper part of said ring bearing portion forms an annular upward extension of said body, said top wall increasing radially in thickness from the center and having a flat top surface; and a piston head having a flat bottom surface engaging said top surface, the wall of said head having a portion in alignment with the outer wall of said ring bearing portion, and a second portion conforming to the contour of the inner wall of said annular extension but spaced therefrom; and means for mounting said head on said body.

3. A piston construction for high temperature engines, such as compression ignition and the like engines, including a piston body having a cylindrical skirt, a substantial cylindrical ring bearing portion above said skirt, a top wall joined to said ring bearing portion intermediate the ends thereof whereby the upper part of said ring bearing portion forms an annular upward extension of said body, said top wall increasing radially in thickness from the center and having an annular flat top surface around a central cylindrical recess; and a piston head having an annular flat bottom surface engaging said top surface, and a central cylindrical extension seated in said recess, the wall of said head having a portion in alignment with the outer wall of said ring bearing portion, and a second portion conforming to the contour of the inner wall of said annular extension but spaced therefrom; and means for mounting said head on said body comprising aligning means and securing means.

4. A piston construction for high temperature engines, such as compression ignition and the like engines, including a piston body having a cylindrical skirt, a substantial cylindrical ring bearing portion above said skirt, a top wall joined to said ring bearing portion intermediate the ends thereof whereby the upper part of said ring bearing portion forms an annular upward extension of said body, said top wall increasing radially in thickness from the center and having an annular flat top surface around a central cylindrical recess; and a piston head having an annular flat bottom surface engaging said top surface and a central cylindrical extension seated in said recess, said head being otherwise spaced from said body.

CARL G. A. ROSEN.